United States Patent [19]

Harrison et al.

[11] 3,964,975

[45] June 22, 1976

[54] MEANS FOR CONTROLLING THE TEMPERATURE OF A DEPROPANIZER TOWER

[75] Inventors: Charles W. Harrison, Nederland; Glenn A. Senters, Beaumont, both of Tex.

[73] Assignee: Texaco Inc., New York, N.Y.

[22] Filed: Aug. 19, 1974

[21] Appl. No.: 498,331

[52] U.S. Cl. .............................. 196/132; 202/160; 202/206; 203/2; 235/151.12; 23/253 A
[51] Int. Cl.² ...................... B01D 3/42; C10G 7/02; G05B 21/02
[58] Field of Search ........... 196/132; 202/160, 206; 203/1, 2, DIG. 18; 208/DIG. 1; 235/151.12; 73/64.2

[56] References Cited

UNITED STATES PATENTS

| | | | |
|---|---|---|---|
| 2,378,116 | 6/1945 | Whaley | 196/132 |
| 2,456,398 | 12/1948 | Gerhold | 196/132 |
| 2,868,701 | 1/1959 | Berger | 202/160 X |
| 2,974,182 | 3/1961 | Van Pool | 203/1 X |
| 3,108,929 | 10/1963 | Tolin et al. | 196/132 X |
| 3,434,934 | 3/1969 | Washer | 203/DIG. 18 |
| 3,686,488 | 8/1972 | Woodle | 196/132 X |
| 3,881,994 | 5/1975 | Fickel | 196/132 |
| 3,901,062 | 8/1975 | Lynch et al. | 73/64.2 |

Primary Examiner—Morris O. Wolk
Assistant Examiner—Bradley R. Garris
Attorney, Agent, or Firm—Thomas H. Whaley; Carl G. Ries; Ronald G. Gillespie

[57] ABSTRACT

The temperature of light straight run gasoline from a depropanizer tower is controlled as the function of the Reid Vapor Pressure change of a crude oil feeding a flash tower which provides an overhead product to the depropanizer tower and flashed crude oil to an atmospheric tower. The Reid Vapor Pressure is determined from the overhead product, the flashed crude, the pressure of the vapor in the flash tower and the temperature of liquid in the flash tower. A control unit includes a network which determines a change in the Reid Vapor Pressure as the quality of the feed crude oil to the flash tower changes. The network determines the change in the Reid Vapor Pressure and when the change exceeds a limit, provides a feed forward signal corresponding to a desired temperature associated with the new Reid Vapor Pressure. The desired temperature signal is determined in accordance with the equations hereinafter disclosed. The desired temperature signal is supplied to a time select circuit which will not implement the desired temperature signal until after the elapse of a predetermined time interval to account for the delay time for the change of feed crude oil to effect the quality of the feed to the depropanizer tower so that the temperature control may be implemented at the proper time.

5 Claims, 3 Drawing Figures

MEANS FOR CONTROLLING THE TEMPERATURE OF A DEPROPANIZER TOWER

BACKGROUND OF THE INVENTION

Field of the Invention

The present invention relates to control systems in general and, more particularly, to a control system for a system having a flash tower and a depropanizer tower.

SUMMARY OF THE INVENTION

A system controls a refining unit which includes a first tower receiving a feed liquid and providing an overhead vapor to a second tower and a first processed liquid to a third tower and the second tower provides a second processed liquid, a portion of which is heated to a desired temperature by a heater and recirculated back to the second tower. The flow rates of the overhead vapor and the first processed liquid leaving the first tower, a pressure in the first tower and a temperature of the liquid in the first tower are sensed. The first processed liquid is also sampled. A circuit provides a signal corresponding to the Reid Vapor Pressure of the feed liquid in accordance with the sensed parameters and the sample of the first processed liquid. The temperature of the second processed liquid is also sensed. A network connected to the temperature sensor sensing the second process liquid temperature and receiving the Reid Vapor Pressure signal provides a signal corresponding to the desired temperature for the second processed liquid after a predetermined time delay commencing with a change in the quality of the feed liquid. Control apparatus controls the heater so as to control the temperature of the second processed liquid being fed back to the second tower in accordance with the desired temperature signal.

The objects and advantages of the invention will appear more fully hereinafter from a consideration of a detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE INVENTION

Figure 1:
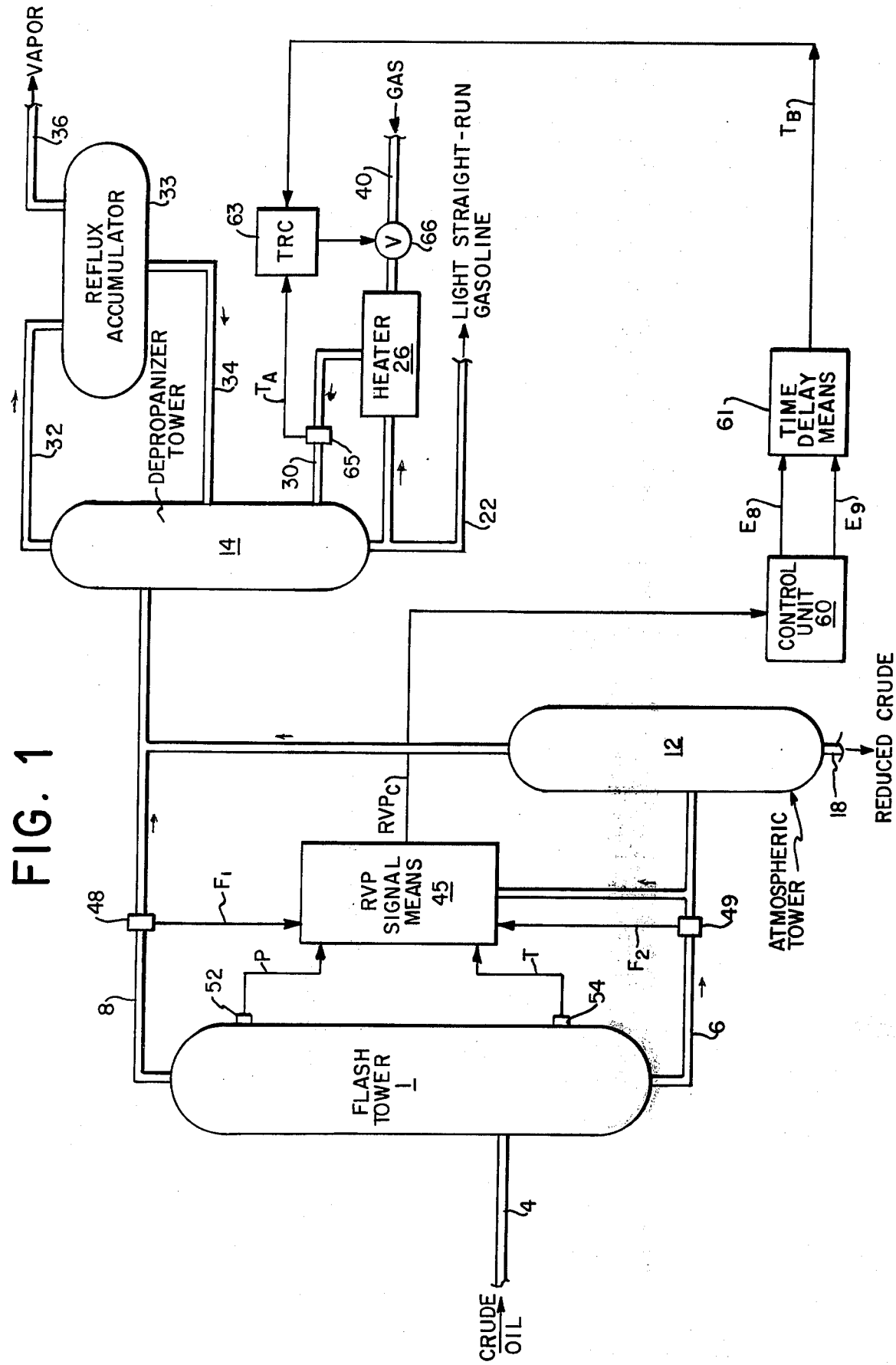
FIG. 1 is a simplified block diagram of a control system, constructed in accordance with the present invention, for controlling the temperature of light straight run gasoline from a depropanizer tower in a refining system which is also partially shown in schematic form.

Referring to FIG. 1, there is shown a flash tower 1 receiving crude oil by way of a line 4 and providing flashed crude oil by way of a line 6 and light components vapor by way of a line 8. The flashed crude is provided to an atmospheric tower 12 while the light components vapor is provided to a stabilizer such as a depropanizer tower 14. Other stabilizers may be a debutanizer, deisohexanizer and depentanizer towers.

Atmospheric tower 12 provides reduced crude by way of a line 18, while depropanizer tower 14 provides light straight run gasoline, some of which is heated by a heater 26 and fed back to the depropanizer tower 14 by way of a line 30.

Depropanizer tower 14 also provides an overhead product to a line 32 to a reflux accumulator which provides a liquid stream back to depropanizer tower 14 by way of a line 34 and a vapor product by way of a line 36.

The change $\Delta T$ in the temperature of the light straight run gasoline leaving tower 14 is controlled to help stabilize the gasoline in accordance with the following equations:

1. $\Delta RVP_B = \dfrac{(K_1)(\Delta RVP_c)}{RVP_c - K_2}$, and

2. $\Delta T = (K_3)(\Delta RVP_B)$ where $K_1$, $K_2$ and $K_3$ and constants and may have preferred values of 0.83, 5.5 and 4.46, respectively, $\Delta RVP_c$ is the change in the Reid Vapor Pressure of the crude oil in line 4 and $\Delta RVP_B$ is the calculated change in Reid Vapor Pressure of the gasoline.

The temperature of the light straight run gasoline leaving the depropanizer tower 14 is controlled by controlling gas being fed to heater 26 by way of a line 40 to achieve control of the stabilization of the gasoline product. In controlling the temperature, utilization of RVP signal means 45 is described in detail in U.S. application Ser. No. 484,003, filed June 28, 1974, now U.S. Pat. No. 3,901,062.

It would be appreciated by one reading the detailed description in the aforementioned U.S. application that the inclusion of such a description in the present application would encumber the understanding of the present invention. Suffice it to say that RVP signal means 45 receives signals corresponding to the flow rates of the light components vapor in line 8 and the flashed crude in line 6 from sensors 48 and 49, respectively. Signal means 45 also receives a signal P from a sensor 52 corresponding to the sensed pressure in flash tower 1 and another signal T from a sensor 54 corresponding to the temperature of a liquid in flash tower 1. Signal means 45 also samples the flashed crude in line 6. In turn, signal means 45 provides a signal $RVP_c$, corresponding to the Reid Vapor Pressure for the crude oil in line 4, to a control unit 60. Control unit 60, which will be explained in detail hereinafter, provides a temperature change signal $E_8$ and a pulse signal $E_9$ to time delay means 61 which in turn provides a desired temperature signal $T_B$ to a temperature recorder-controller 63, to adjust the set point of temperature recorder-controller 63. Temperature recorder-controller 63 receives a signal $T_A$ corresponding to the temperature of the light straight run gasoline being returned to depropanizer tower 14 through line 30. Temperature recorder-controller 63 provides a signal to a valve 66 in line 40 to control the gas flow to heater 26 so as to control the temperature of the light straight run gasoline in accordance with the difference between the sensed temperature $T_A$ and a temperature associated with the position of the set point of controller 63, so that the temperature of the light straight run gasoline substantially corresponds to the desired temperature.

Figure 2:
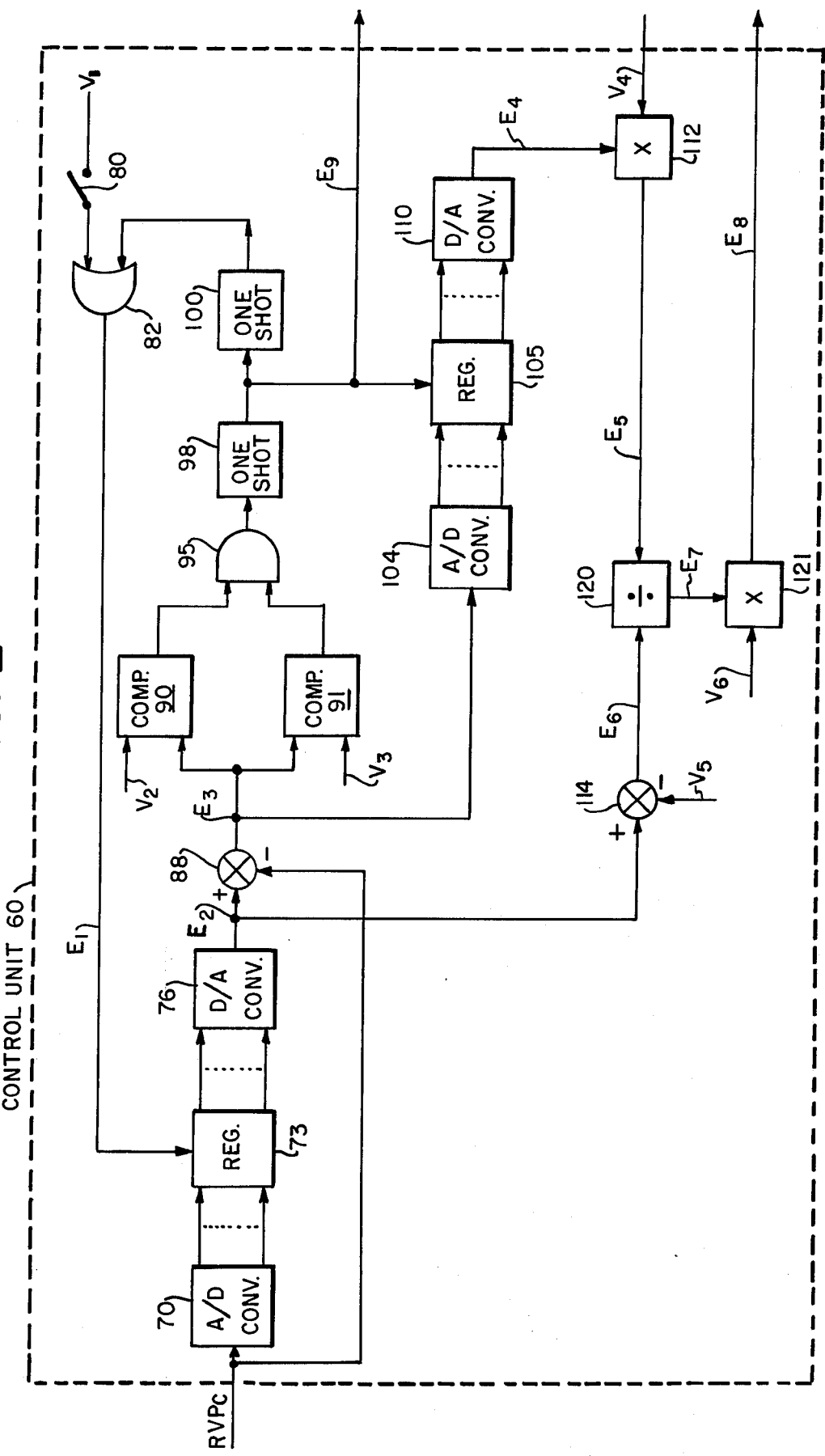
FIGS. 2 and 3 are detailed block diagrams of the control units and the time delay means shown in FIG. 1.

Referring now to FIG. 2, control unit 60 includes an analog-to-digital converter 70 which converts signal $RVP_c$ to digital signals and provides them to a storage register 73. The entrance of the digital signals into register 73 is controlled by a pulse $E_1$ which is developed as hereinafter explained. Register 73 provides digital signals corresponding to its contents which are converted to an analog signal $E_2$ by a conventional type digital-to-analog converter 76. During operation, an initial signal $RVP_c$ is stored in register 73 by an operator who activates a momentary-type switch 80 receiving a direct current voltage $V_1$. The momentary activation of switch 80 causes voltage $V_1$ to be provided as a pulse to an OR gate 82 which in turn provides the pulse as pulse $E_1$, causing register 73 to enter the initial value for $RVP_c$. Signal $E_2$ corresponds to the stored $RVP_c$ signal.

As the crude oil changes in quality, its $RVP_c$ changes accordingly. Subtracting means 88 subtracts the $RVP_c$ signal from signal $E_2$ to provide a difference signal $E_3$ corresponding to the change $\Delta RVP_c$ in the Reid Vapor Pressure of the crude oil. Since the Reid Vapor Pressure of the crude oil may change by slight amounts during normal operation it is necessary that only a substantial change in Reid Vapor Pressure activate the control system. In this regard, comparators 90, 91 receive signal $E_3$ and voltages $V_2$ and $V_3$, respectively, corresponding to an upper limit and a lower limit, respectively, for a change $\Delta RVP_c$ in the Reid Vapor Pressure of the crude oil.

While signal $E_3$ is within the limits defined by voltages $V_2$ and $V_3$, comparators 90 and 91 provide high level outputs to an AND gate 95 which in turn provides a high level output to a one-shot multivibrator 98. Should signal $E_3$ exceed either limit, one of the comparators 90 or 91 will provide a low level output causing AND gate 95 to provide a low level output to one-shot 98. The changing from a high level to a low level, triggers one shot multivibrator 98 causing it to provide a pulse whose trailing edge triggers another one-shot multivibrator 100 causing it to provide a pulse to OR gate 82. OR gate 82 provides the pulse as pulse $E_1$. This pulse controls register 73 to enter the digital signals corresponding to the new value for the Reid Vapor Pressure for the crude oil.

Signal $E_3$ corresponding to the change in the Reid Vapor Pressure is also provided to another analog-to-digital converter 104 which converts signal $E_3$ to digital signals and provides them to a storage register 105. The entry of digital signals from converter 104 into register 105 is controlled by the leading edge of the pulse from one shot 98 so that prior to signal $E_3$ being changed as a result of a pulse $E_1$, the digital value for signal $E_3$ is stored in register 105. Register 105 provides digital signals, corresponding to the stored $RVP_c$ value, to a digital-to-analog converter 110 which in turn provides an analog signal $E_4$ corresponding to the stored change in the Reid Vapor Pressure $\Delta RVP_c$ of equation 1. A multiplier 112 multiplies signal $E_4$ with a voltage $V_4$ corresponding to the constant 0.83 in equation 1.

Subtracting means 114 subtracts a direct current voltage $V_5$, corresponding to the term 5.5 in equation 1, from signal $E_2$ to provide a signal $E_6$ corresponding to the expression $RVP_c-5.5$. A divider 120 divides signal $E_5$ with signal $E_6$ to provide a signal $E_7$ corresponding to the change in the Reid Vapor Pressure that will occur in the depropanizer tower 14 product quality as a result of the change in the crude charge quality. Signal $E_7$ is multiplied with a direct current voltage $V_6$ corresponding to the term 4.46 in equation 2 by a multiplier 121 to provide a signal $E_8$ corresponding to a change to an original target temperature for the light straight run gasoline.

Figure 3:
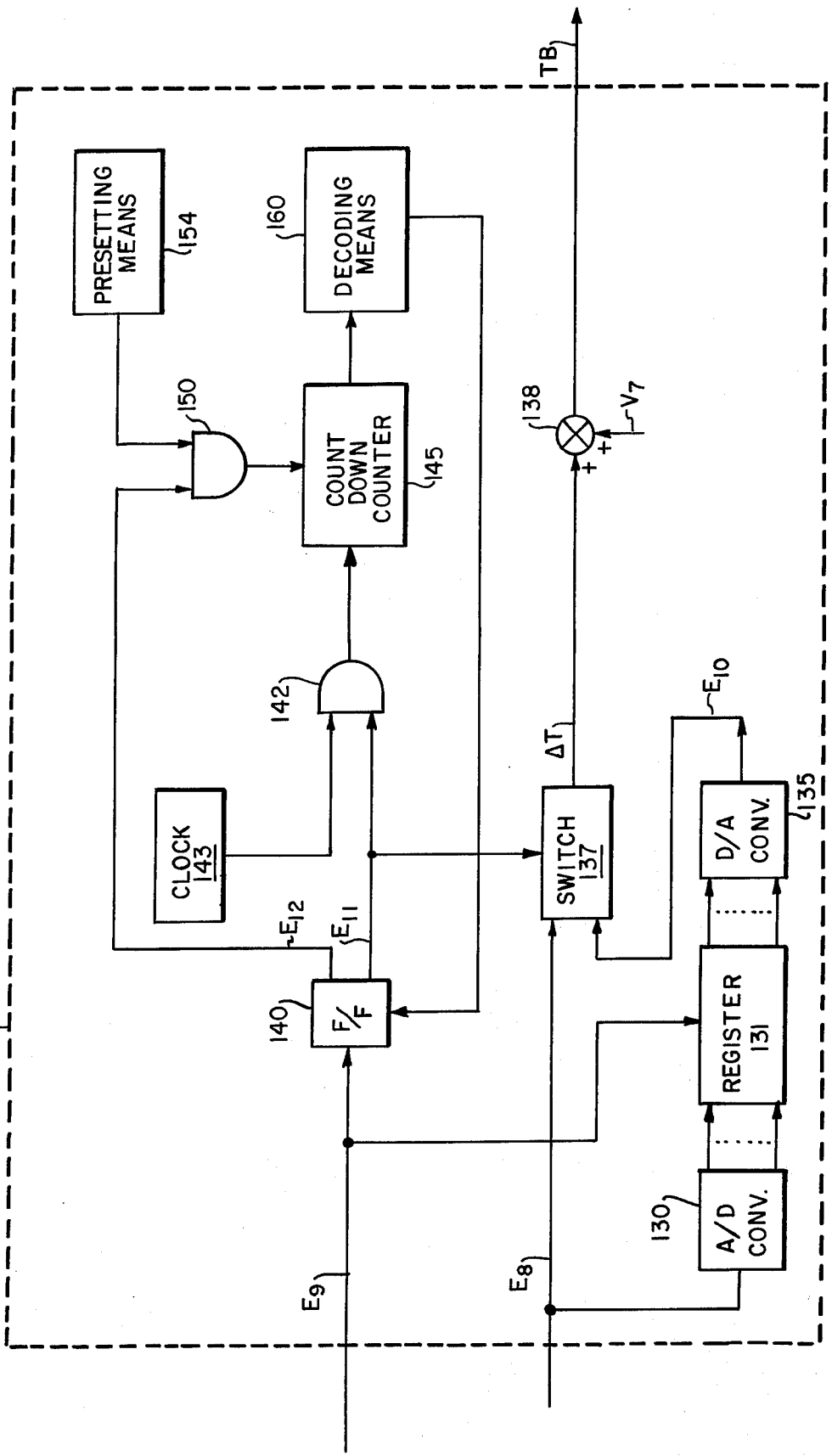

Referring to FIG. 3, time delay means 61 delays the effect of the change in $RVP_c$ for a predetermined time interval. The delay is desirable since signal $E_8$ is a feed forward signal. The new feed resulting from the new crude oil will not reach the depropanizer tower 14 until after the lapse of a time interval. Referring to FIGS. 1, 2 and 3, signal $E_8$ is applied to a conventional type analog to digital converter 130 which converts signal $E_8$ to corresponding digital signals and provides the digital signals to a register 131.

At this point $E_8$ has not change value to any significant extent. Register 131 provides digital signals to a digital to analog converter 135 which in turn provides an analog signal $E_{10}$ to a switch 137. The analog signal from converter 135 corresponds to a change in the gasoline temperature. Signal $E_8$ will not change value until the change in crude oil quality causes a pulse $E_9$ to occur as heretofore explained. Pulse $E_9$ occurs prior to pulse $E_1$ so that when pulse $E_9$ occurs the digital versions of signals $E_2$ and $E_8$ are entered into registers 105 and 131, respectively, before signals $E_2$ and $E_8$ change values. Signal $E_8$ is also applied to switch 137. Switch 137 is an electronic switch which in essence is a single pole, double throw switch and selects between signal $E_8$ and signal $E_{10}$ to pass one of them as signal $\Delta T$. Summing means 138 sums signal $\Delta T$ from switch 137 with a direct voltage $V_7$ corresponding to the original target temperature to provide signal $T_B$.

Pulse $E_9$ is also provided to a flip-flop 140 which triggers flip-flop 140 to a set state causing it to provide an output $E_{11}$ at a high level to switch 137 and to an AND gate 142. The high level of output $E_{11}$ controls switch 137 to provide signal $E_{10}$ as signal $\Delta T$ while blocking signal $E_8$ so that as signal $E_8$ changes to its new value, signal $T_B$ remains at the old value and continues to do so until after the elapse of a predetermined time delay.

The high level of output $E_{11}$ enables AND gate 142, receiving clock pulses from a clock 143, to pass those clock pulses to a countdown counter 145. Counter 145 has been preset to a count corresponding to the predetermined time delay as hereinafter explained. A second direct current output $E_{12}$ from flip-flop 140 is at a low level when flip-flop 140 is in a set state and is applied to a plurality of AND gates 150 (only one AND gate 150 is shown for convenience) so that AND gates 150 are disabled during the countdown process of counter 145. Presetting means 154 provides preset signals to AND gates 150 but since counter 145 is counting down and AND gates 150 are disabled, presetting means 154 cannot preset counter 145 during the countdown process. When counter 145 reaches a zero count, decoding means 160 receiving signals corresponding to the count in counter 145 provides a reset pulse to flip-flop 140 resetting flip-flop 140 to the clear state.

When flip-flop 140 is in a clear state, outputs $E_{11}$, $E_{12}$ go to a low level and high level respectively. Signal $E_{11}$ disables AND gate 142 to stop any more clock pulses from entering counter 145. Output $E_{12}$ now at a high level enables AND gates 150 to pass preset signals from presetting means 154 so as to preset counter 145 to the count corresponding to the predetermined time delay. It would be appreciated by one skilled in the art that the details of presetting means 154 is not necessary to an understanding of the present invention. Presetting means 154 may include switches of the type well known in the art providing binary-coded-decimal signals which are converted to a pure binary figure by conventional type BCD to binary converters.

When flip-flop 140 is switched to the clear state and output $E_{11}$ goes to a low level, switch 137 passes signal $E_8$ as $\Delta T$ signal while blocking signal $E_{10}$ so that temperature recorder controller 63 receiving signal $T_B$ can now implement the new desired temperature.

The system of the present invention as heretofore described controls the temperature of light straight run gasoline from a depropanizer tower in accordance with changes in the Reid Vapor Pressure of feed crude oil to a flash tower providing an overhead product to the depropanizer tower. The change in the Reid Vapor Pressure of the feed crude oil is used to develop a feed forward temperature signal which is delayed for a predetermined time to allow the effects of the change in the crude oil to reach the depropanizer tower before controlling the temperature.

What is claimed is:

1. A refining unit comprising a flash tower receiving raw crude oil, an atmospheric tower receiving a flashed crude oil from said flash tower, a depropanizer tower receiving a light component vapor from said flash tower and producing gasoline, recirculating means including a heater for withdrawing, heating to a desired temperature and recirculating a portion of said gasoline back to said depropanizer tower, said refining unit further including a control system comprising flow rate sensing means for sensing the flow rates of the vapor and the flashed crude oil and providing signals corresponding thereto, pressure sensing means for sensing the pressure in the flash tower and providing a corresponding signal, first temperature sensing means for sensing the temperature of a liquid in the flash tower and providing a signal related thereto, Reid Vapor pressure signal means sampling the flashed crude oil and receiving the flow rate signals, the pressure signal and the temperature signal, for providing a signal corresponding to the current Reid Vapor Pressure of the raw crude oil, second temperature sensing means for sensing the temperature of the gasoline being recirculated back to the depropanizer tower and providing a signal corresponding thereto, desired temperature signal means for providing a signal corresponding to the desired temperature for the gasoline being recirculated back to the depropanizer tower, change signal means connected to the desired temperature signal means and to the Reid Vapor Pressure signal means for providing a change signal to the desired temperature signal means so as to cause the desired temperature signal means to change the amplitude of the desired temperature signal at some predetermined time after a change in the Reid Vapor Pressure has occurred and in accordance with the current Reid Vapor Pressure signal, and control means receiving the desired temperature signal and the sensed gasoline temperature signal for controlling the heater so as to control the temperature of the gasoline being recirculated back to the depropanizer tower.

2. A refining unit as described in claim 1 in which the desired temperature signal means includes target temperature means for providing a signal corresponding to a target temperature, and combining means connected to the target temperature means and to the change signal means for combining the change signal and the target temperature signal to provide the desired temperature signal.

3. A refining unit as described in claim 2 in which the change signal means includes first storing means connected to the Reid Vapor Pressure signal means for storing the Reid Vapor Pressure signal in response to a control pulse, difference signal means connected to the first storing means and to the Reid Vapor Pressure signal means for providing a signal corresponding to a difference between the current Reid Vapor Pressure signal and the stored Reid Vapor Pressure signal, comparing means connected to the difference signal means receiving direct current voltages corresponding to predetermined limits for a change in the Reid Vapor Pressure for comparing the difference signal with the reference voltages and providing a signal corresponding to the comparison, pulse means connected to the comparing means for providing sequentially a first and a second control pulse in response to the comparison signal indicating that the difference signal has exceeded a predetermined limit, the second control pulse being provided to the first storing means, second storing means connected to the pulse means and to the difference signal means for storing the difference signal in response to the second control pulse provided by the pulse means, $\Delta T$ signal means connected to the two storing means for providing a signal corresponding to a current change $\Delta T$ in temperature for the light straight run gasoline in accordance with the signals from the storing means and the following equations:

$$\Delta RVP_B = \frac{K_1(\Delta RVP_c)}{RVP_c - K_2} \text{ and}$$

$$\Delta T = (K_3)(\Delta RVP_B)$$

where $\Delta RVP_c$ and $\Delta RVP_B$ are the changes in the Reid Vapor Pressures for the raw crude oil and the gasoline, respectively, and $K_1$, $K_2$ and $K_3$ are constants.

4. A refining unit as described in claim 3 in which the change signal means includes $\Delta T$ storing means connected to the $\Delta T$ signal means for storing the current $\Delta T$ signal in response to the second pulse from the pulse means, switching means connected to the combining means, to the $\Delta T$ signal means and to the $\Delta T$ storing means for passing the current $\Delta T$ signal from the $\Delta T$ signal means as the change signal while blocking the stored $\Delta T$ signal when a control signal is of one amplitude and passing the stored $\Delta T$ temperature as the change signal while blocking the current $\Delta T$ signal when the control signal is of another amplitude, delay circuit means connected to the pulse means for providing the control signal of the other amplitude in response to the second pulse from the pulse means so as to cause the switching means to pass the stored $\Delta T$ signal to the combining means as the change signal providing the control signal of the one amplitude after a predetermined time delay to cause the switching means to pass the current $\Delta T$ signal to combining means as the change signal.

5. A refining unit as described in claim 4 in which the delay circuit means includes a flip-flop providing the control signal of the other amplitude in response to the second pulse from the pulse means and of the one amplitude in response to a reset pulse, means for providing timing pulses, and AND gate receiving the control signal and the timing pulses passes the timing pulses when the control signal is of the other amplitude and blocks the timing pulses when the control signal is of the one amplitude, counting means connected to the AND gate for counting the timing pulses passed by the AND gate, means connected to the counting means for presetting a count corresponding to a desired time delay in the counting means, and means connected to the count down counting means for providing the reset pulse to the flip-flop when the count in the counting means reaches a predetermined count.

* * * * *